Patented Feb. 23, 1954

2,670,350

UNITED STATES PATENT OFFICE 2,670,350

METHOD OF PREPARING CHOLINE SALT OF THEOPHYLLINE

Peter Claude Hereld, East Meadow, N. Y., assignor, by mesne assignments, to Nepera Chemical Co., Inc., Yonkers, N. Y., a corporation of New York No Drawing. Application August 8, 1952, Serial No. 303,419

2 Claims. (Cl. 260—256)

This invention relates to a choline salt of a xanthine as a new chemical compound useful in medicine and more especially to the compound theophyllin cholinate, which has been found to be beneficial in the treatment of atherosclerosis, arteriosclerosis and cardio-vascular diseases.

It is an object of this invention to produce the choline salt of the xanthine theophylline which has good stability in air and which can thus be administered in liquid form.

It is a further object of the invention to produce theophyllin cholinate, which is a new chemical compound useful in medicine and which has properties giving it advantages not shared by uncholinated theophylline or other theophyllin compounds.

More specifically, it is an object of the invention to produce the choline salt of theophylline to form a medicinally valuable compound which is vastly superior to theophylline ethylenediamine and theophylline sodium glycinate.

A still further object of the invention resides in procedure by means of which the new compound can be prepared.

The xanthine theophylline is used in medicine although its therapeutic value is accompanied by certain adverse side effects. For example, theophylline and its previously known derivatives are insoluble or only slightly soluble in water and they are incompatible with digestive fluids and thus cause precipitation and digestive upsets.

The choline salt of theophylline, according to the invention, is prepared by reacting an acid salt of choline dissolved in an organic solvent in which it is soluble, with an alkali metal salt of the xanthine, also in methanol. The alkali cation of the xanthine salt and the acid anion of the choline salt combine to form the salt thereof which precipitates, while the xanthine cholinate thus produced remains in solution. The precipitate is removed, as by filtration, and the solvent is evaporated from the filtrate to yield the xanthine cholinate in dry powder form.

As a specific example for producing theophyllin cholinate (theophylline hydroxyethyltrimethylamine), equimolecular proportions of choline chloride and potassium theophyllinate, each in methanol, are reacted to produce theophyllin cholinate and potassium chloride. The solution of theophyllin cholinate is separated from the potassium chloride precipitate and evaporated to dryness, thus producing a white crystalline powder having a slight amine odor and being very soluble in water and ethanol. The compound has a molecular weight of 283 and a melting point of 176–178° C. and responds to the formula $C_7H_7O_2N_4:C_5H_{14}ON$. Its composition is equivalent to 60% anhydrous theophylline and 40% choline base. One molecule of the new compound in 825 cc. $H_2O$ will absorb 0.18 mols of $CO_2$ before theophylline will precipitate.

The new compound theophyllin cholinate can be processed to pharmaceutical specialties in a manner similar to that of theophylline ethylenediamine (Aminophyllin). The dosage of theophyllin cholinate is 33% greater than theophylline ethylenediamine and 25% less than theophylline sodium glycinate due to the presence of the cholinate in the molecule which has good lipotropic properties, thus making the compound particularly valuable for the treatment of atherosclerosis, arterioschlerosis and cardiovascular diseases.

I claim:

1. The method of preparing theophyllin cholinate which comprises the steps of reacting equimolecular proportions of an acid salt of choline and an alkali metal salt of theophylline, each dissolved in methanol, filtering the reaction products and recovering theophyllin cholinate from the filtrate.

2. The method of preparing theophyllin cholinate which comprises the steps of reacting equimolecular proportions of choline chloride and potassium theophyllinate, each dissolved in methanol, removing the precipitate of potassium chloride from the theophyllin cholinate in solution and evaporating the solution to dryness.

PETER CLAUDE HERELD.

No references cited.